N. A. LASATER.
HARROW ATTACHMENT TO CULTIVATORS.
APPLICATION FILED NOV. 29, 1911.
1,053,302.
Patented Feb. 18, 1913.
2 SHEETS—SHEET 1.
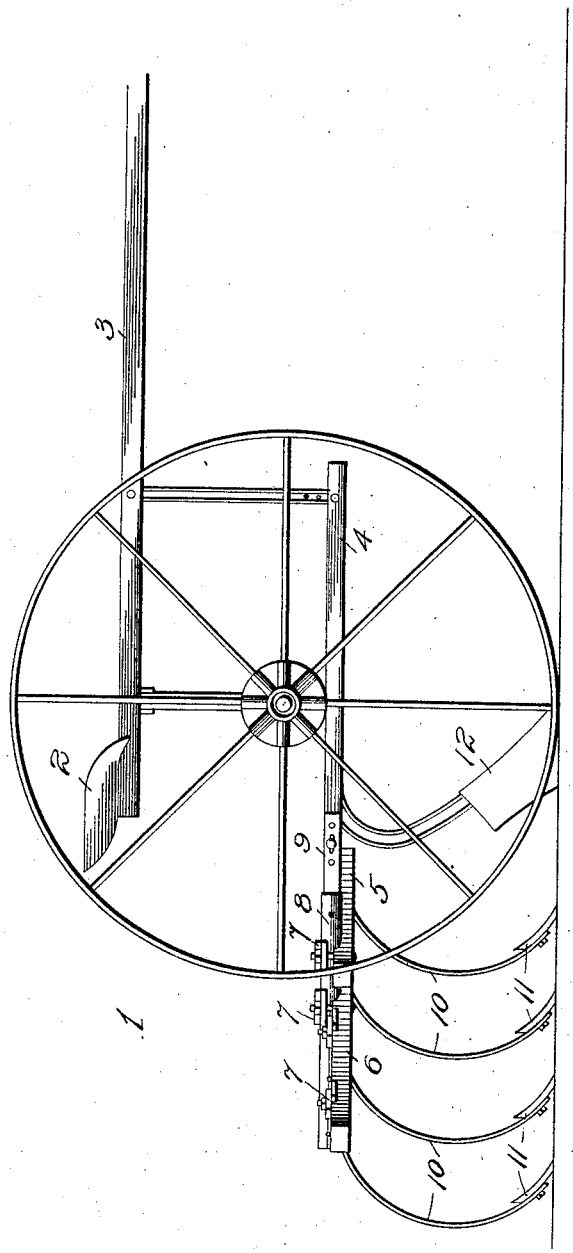
WITNESSES
INVENTOR
Newton A. Lasater
By John S. Duffie
His Attorney

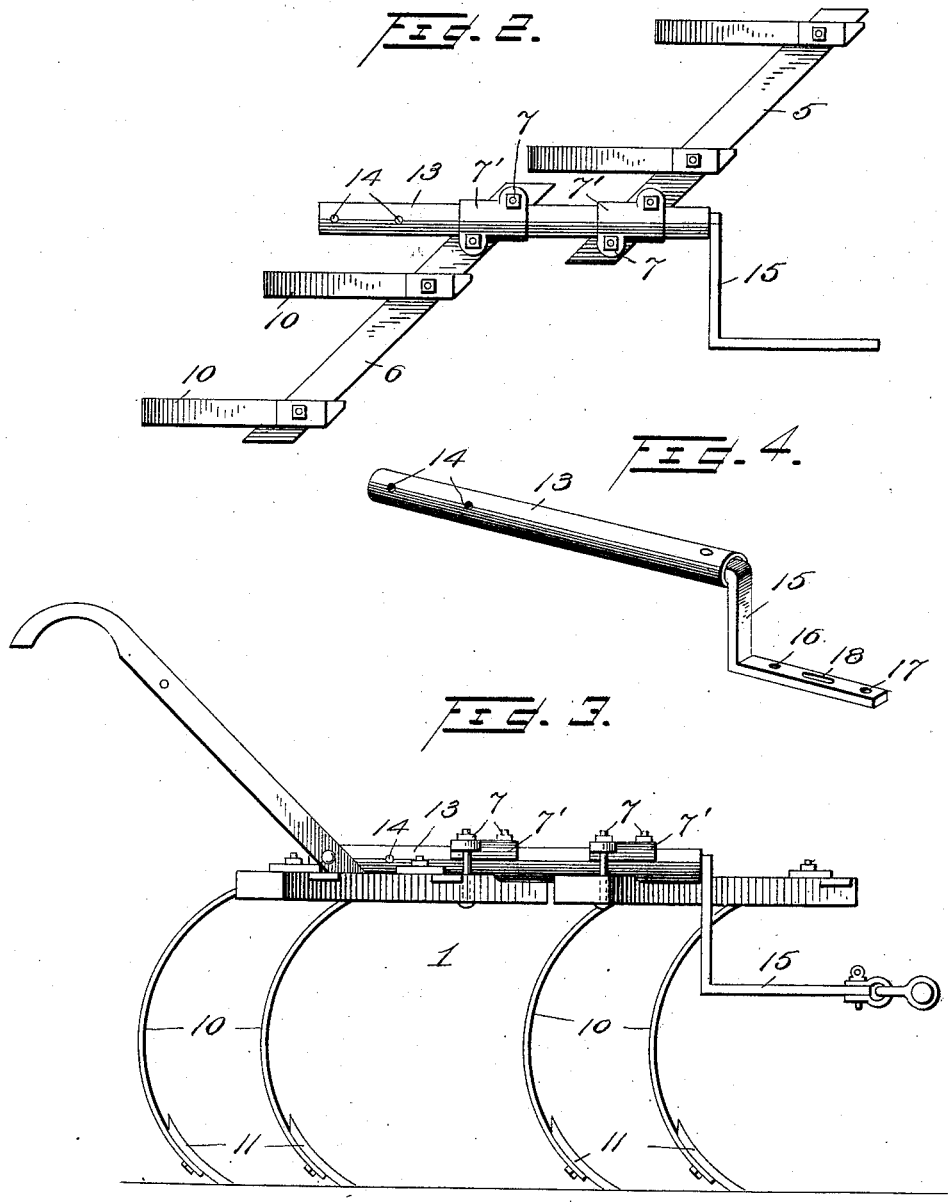

UNITED STATES PATENT OFFICE.

NEWTON A. LASATER, OF MULBERRY, ARKANSAS.

HARROW ATTACHMENT TO CULTIVATORS.

1,053,302. Specification of Letters Patent. Patented Feb. 18, 1913.

Application filed November 29, 1911. Serial No. 663,142.

*To all whom it may concern:*

Be it known that I, NEWTON A. LASATER, a citizen of the United States, residing at Mulberry, in the county of Crawford and State of Arkansas, have invented certain new and useful Improvements in Harrow Attachments to Cultivators, of which the following is a specification.

This invention has relation to cultivator attachments and has for its object to provide an attachment of simple structure which may be easily and readily connected with a cultivator frame of any usual pattern or which may be used independently of the said cultivator frame for the purpose of working or cultivating a crop.

With this object in view, the attachment comprises a beam to the forward end of which is attached an L-shaped resilient arm by means of which the attachment may be connected with a cultivator frame or draft animals. Bars may be adjustably connected with the said beam and the said bars may be provided with soil engaging members of any desired pattern.

For a full understanding of the invention reference is to be had to the following description and accompanying drawing in which:

Figure 1 is a side elevation showing the attachment connected with a frame of the wheel cultivator. Fig. 2 is a top plan view of the attachment. Fig. 3 is a side elevation of the attachment equipped to be connected directly with draft animals. Fig. 4 is a perspective view of the beam and arm of the attachment.

Corresponding and like parts are referred to in the following description and indicated in all of the views of the accompanying drawing by the same reference characters.

As illustrated in Fig. 1, the numeral 1 indicates in general a cultivator, which is provided with a seat 2, tongue 3 and beam 4.

I use in conjunction with my attachment bars 5 and 6 which are connected with a tubular beam 13 by means of clamp members 7' and securing bolts 7. By loosening the bolts 7, the members 7' together with the bars 5 and 6 may be positioned at any desired points along the beam 13. The beam 13 is provided at its rear portion with openings 14 through which securing bolts may be passed for attaching handles of the beam 13 as clearly shown in Fig. 3. A spring arm 15 is connected with the forward end of the beam 13. This arm is L-shaped in edge elevation and is provided at its forward portion with suitable openings and slots indicated at 16, 17 and 18, which enable the same to be connected in any desired manner to the frame of the cultivator or with a draft appliance when draft animals are connected directly with the arm as indicated in Fig. 3. When the attachment is used in conjunction with a cultivator frame or is used independent of a cultivator frame, the bars 5 and 6 are disposed at the opposite sides of the beam 13 and the draft strain is applied to the beam 13 through the L-shaped spring arm 15. When connected with the frame of a cultivator as in Fig. 1, the spring arm 15 is pivoted to the beam 4 so as to be free to swing vertically but at the point of connection with the cultivator it is restrained against lateral swinging movement but may flex or spring laterally, therefore should the soil engaging members 10 upon either of the bars 5 or 6 encounter obstruction, the spring arm 15 will flex so that the said soil engaging members will pass around the said obstruction without injury to the attachment. When the attachment is connected directly with a draft appliance as indicated in Fig. 3, it is held toward its work by an operator who grasps the handles, but should any sudden strain be transmitted from the draft animals to the beam 1, these strains will be cushioned by the spring arm 15, which will flex in an upward and downward direction in the line of draft of the attachment, and thus relieve the beam 13 and the parts carried thereby of sudden jars. In order to gain maximum resiliency and at the same time to have the parts compactly assembled, it is necessary to form the spring arm 15 in the form of an L in edge elevation. This makes it possible to provide sufficient material in the arm 15 and at the same time to have its point of attachment with the draft means in close proximity to the forward end of the beam 13.

Having described my invention, what is claimed as new is:

A cultivator attachment comprising a beam, bars connected to the beam and disposed at the opposite sides thereof, soil engaging members carried by the bars and a spring arm L-shaped in edge elevation and connected at one end with the forward end of the beam and adapted to be connected at its other end with a draft means.

In testimony whereof I affix my signature in presence of two witnesses.

NEWTON A. LASATER.

Witnesses:
JNO. F. HALL,
JNO. F. TURNER.

Copies of this patent may be obtained for five cents each, by addressing the "Commissioner of Patents Washington, D. C."